Oct. 17, 1961  R. B. CATE ET AL  3,004,882
APPARATUS FOR AND METHOD OF PRODUCING FLOOR COVERING
OF REPEATLESS INLAY PATTERN
Filed Feb. 16, 1959  3 Sheets-Sheet 1
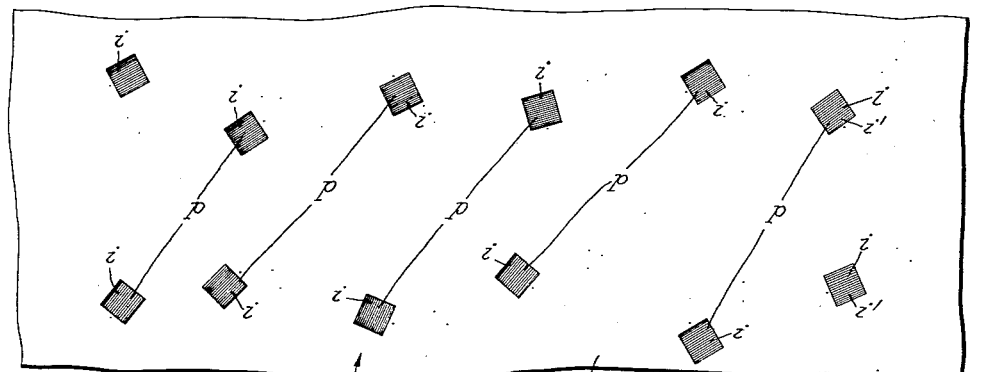
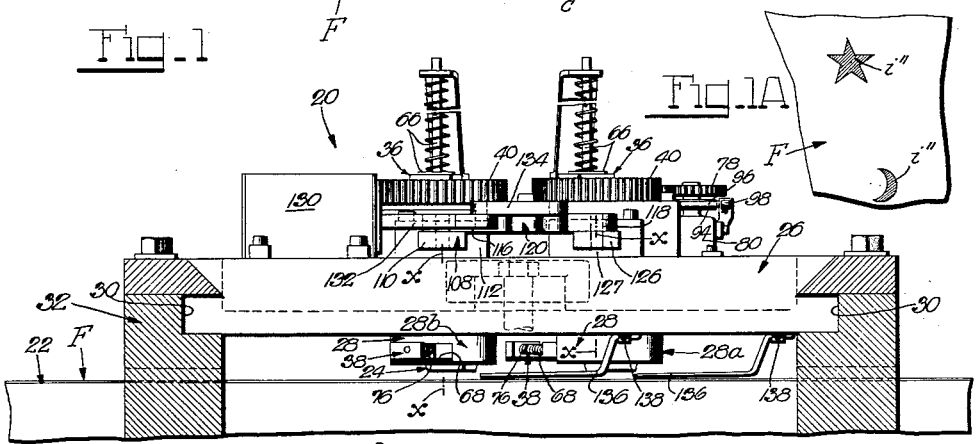
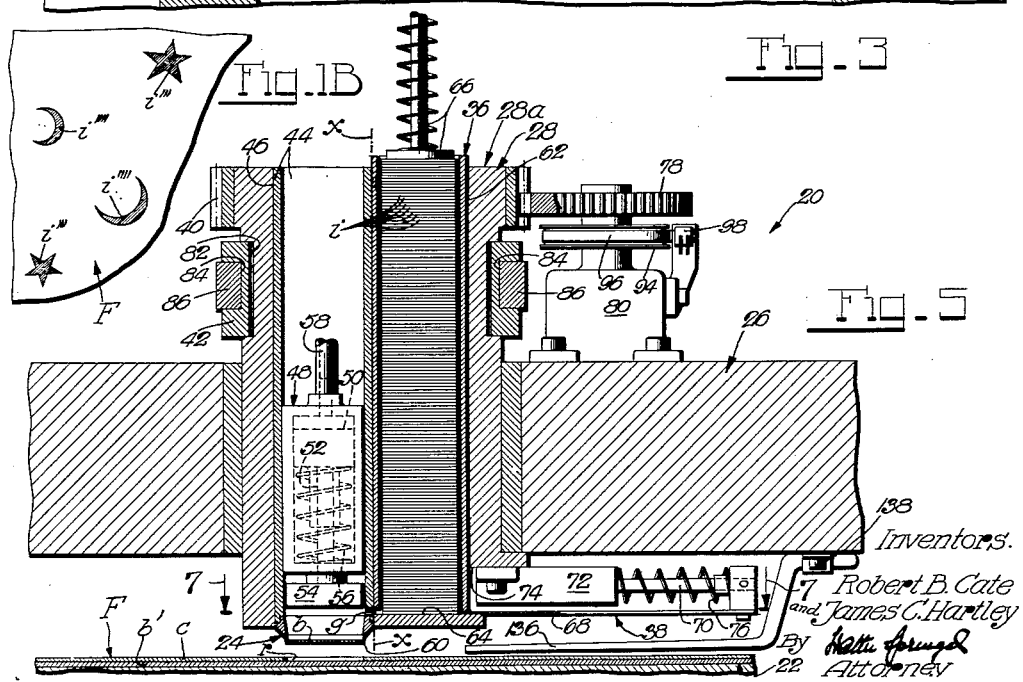
Inventors.
Robert B. Cate
and James C. Hartley
By
Attorney

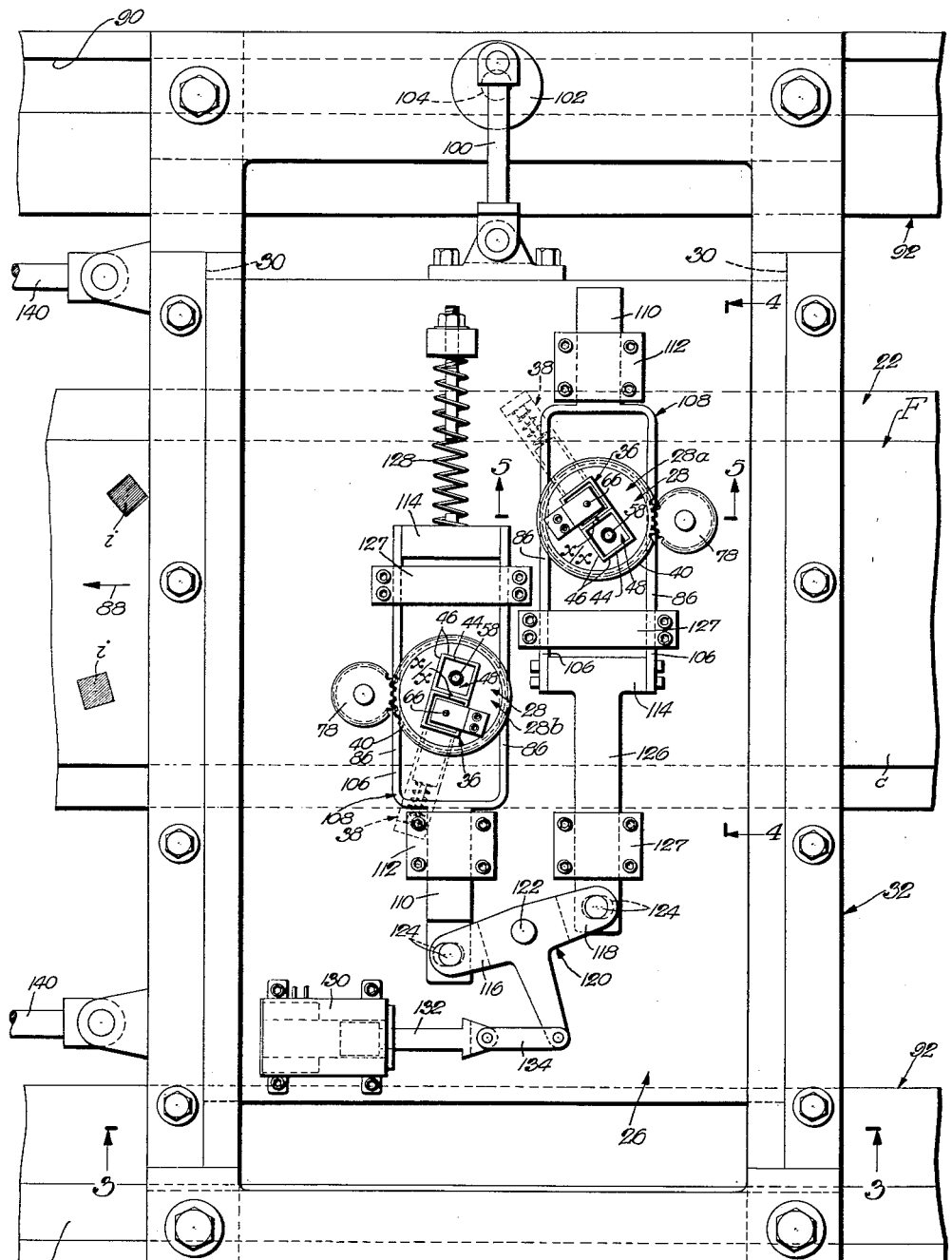

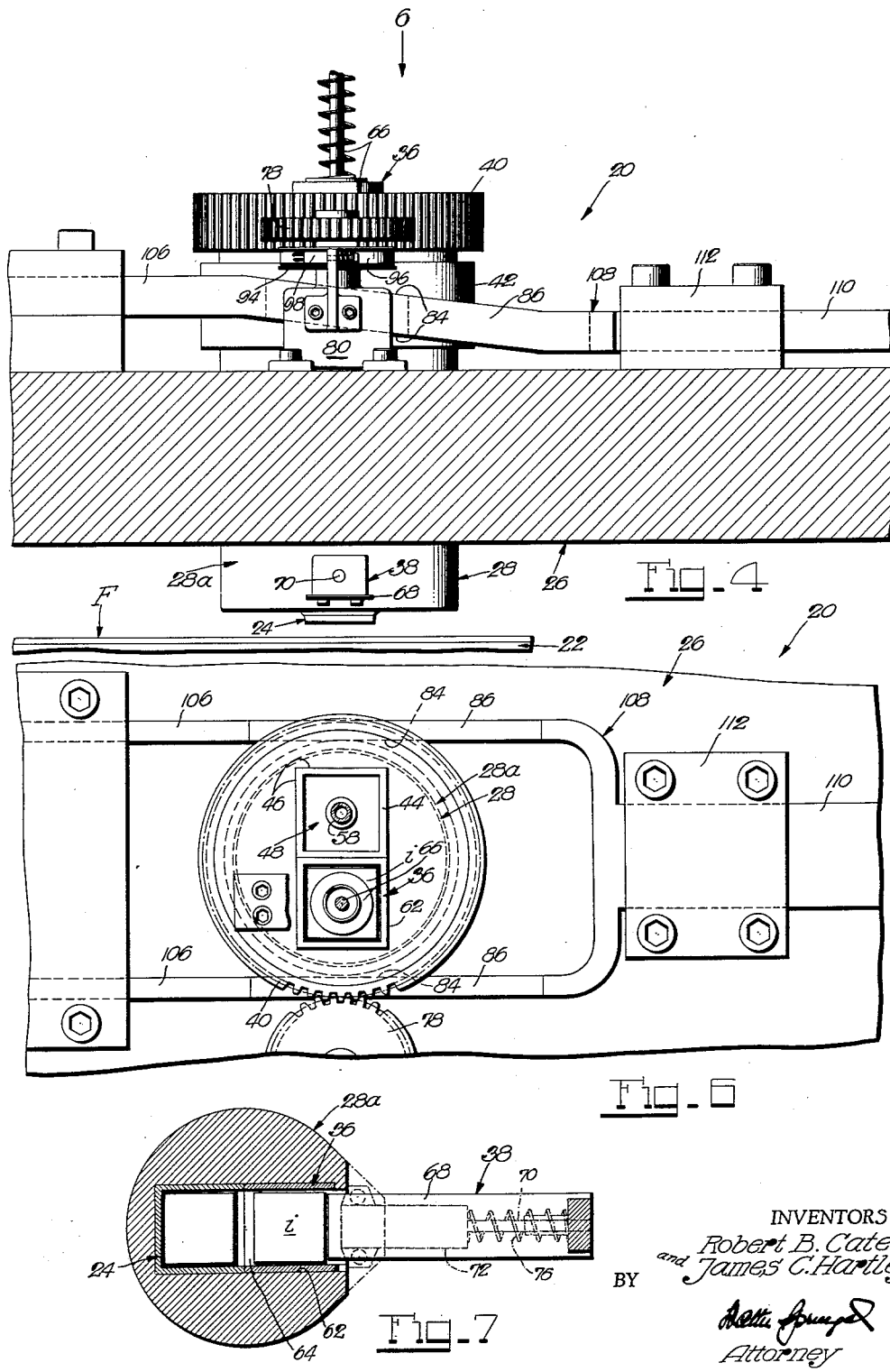

United States Patent Office 3,004,882
Patented Oct. 17, 1961

3,004,882
APPARATUS FOR AND METHOD OF PRODUCING FLOOR COVERING OF REPEATLESS INLAY PATTERN
Robert B. Cate and James C. Hartley, Branford, Conn., assignors to Vinylin Research Incorporated, Branford, Conn., a corporation of Connecticut
Filed Feb. 16, 1959, Ser. No. 793,593
19 Claims. (Cl. 156—423)

This invention relates to the production of inlaid floor covering in general, and to apparatus for and a method of making floor covering with inlays of random arrangement in particular.

It is the primary aim and object of the present invention to provide for the production in a continuous operation of floor covering with inlays of such random arrangement and even including inlays of different sizes and/or shapes, that the inlay pattern varies infinitely from any regular inlay pattern and is most unlikely to repeat over any length of the floor covering. Floor covering thus produced not only has the unique appearance of an endlessly changing inlay pattern throughout its length, but its inlay pattern, by the very reason of its endless change throughout, will match with that of any other length of this floor covering, thereby also eliminating the extra cost and waste of excess lengths of floor coverings with repeat inlay patterns as necessitated by their matching requirements, as well as the extra labor cost involved in laying the same in the required matched fashion.

Thus, it is among the objects of the present invention to devise a method of producing floor covering of this repeatless inlay pattern type, according to which dies not only serve to blank from the composition stock of the floor covering pieces of the same shape and size as the inlays with which they are to be replaced and also to deposit the inlays in the same recesses in the composition stock which they formed therein by their own blanking operations, but the dies are movable, bodily and rotatively, relative to the composition stock into an infinite number of different random relative dispositions in which they perform on the stock and, hence, create the inlay pattern-to-be of the floor covering.

It is another object of the present invention to provide apparatus for producing inlaid floor covering of this type in accordance with the aforementioned method and in a continuous operation.

It is a further object of the present invention to provide apparatus of this type in which a plurality of dies are movable bodily and rotatively to create the inlay pattern-to-be of the floor covering as aforementioned, and are also movable in unison into and from operative engagement with the composition of the floor covering for blanking pieces therefrom and also replacing them with inlays therein.

Another object of the present invention is to provide apparatus of this type in which the dies are mounted on a common carrier for their aforementioned bodily and rotative movement into the inlay-pattern creating random relative dispositions, and presently also for their joint movement into and from operative engagement with the composition of the floor covering, and the common carrier is also movable at least transversely of the feed direction of the floor covering into an infinite number of different positions so as to lend further variations to the inlay pattern widthwise of the floor covering over and above those achievable with the bodily and rotatively movable dies alone.

A further object of the present invention is to provide apparatus of this type in which the dies are mounted on the aforementioned carrier for rotation about axes eccentric in relation to the respective dies, so that on mere random turning of any number or all of the dies the latter may assume an infinite number of random relative dispositions in which they are not only differently spaced from each other both, longitudinally and transversely of the floor covering, but are also differently angularly displaced from each other, with ensuing infinite variation of the inlay pattern-to-be of the floor covering.

It is another object of the present invention to provide apparatus of this type in which the dies have plungers therein which are outwardly projectible not only to eject blanked composition pieces from the dies but also to force injected inlays in the dies from the latter into the blanked out recesses in the composition stock of the floor covering.

It is a further object of the present invention to make provisions in apparatus of this type for jointly moving the dies for each inlay cycle thereof through two consecutive work strokes into and from operative engagement with the composition stock of the floor covering while holding them fixed in their inlay-pattern creating relative dispositions, with the dies on their first stroke blanking pieces from the composition stock and having them ejected by their plungers, and on their second stroke transferring injected inlays into the composition stock.

Another object of the present invention is to make provisions in apparatus of this type for directing jets of a fluid under pressure, and preferably compressed air, against those places on the composition stock of the floor covering at which the dies perform, thereby assuredly to blow the ejected composition pieces away from these places as soon as they clear the dies and without requiring any more than slight retraction of the latter from the composition stock, and any more than the briefest pause, if any, between cyclic successive work strokes of the dies.

A further object of the present invention is to provide apparatus of this type in which the dies and their plungers are carried by the aforementioned common carrier for rotation about axes eccentric in relation to the respective dies for the aforementioned infinite variation of the inlay pattern to-be-created by the dies, and each die carries a magazine with a supply of stacked inlays corresponding in shape and size to the associated die, and a reciprocable blade for injecting the bottommost of the stacked inlays in the magazine into the die for its further transfer by the latter and its plunger into the composition stock of the floor covering.

It is a further object of the present invention to provide in apparatus of this type for such power operation of the various operating devices thereof that they readily lend themselves to suitable automatic control of their performance.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary view of exemplary floor covering produced according to the present invention;

FIG. 1A is a fragmentary view of other exemplary floor covering produced according to the present invention;

FIG. 1B is a fragmentary view of further exemplary floor covering produced according to the present invention;

FIG. 2 is a fragmentary plan view of apparatus embodying the present invention;

FIG. 3 is a fragmentary section through the apparatus as taken on the line 3—3 of FIG. 2;

FIGS. 4 and 5 are enlarged fragmentary sections through the apparatus substantially as taken on the lines 4—4 and 5—5, respectively, of FIG. 2;

FIG. 6 is a fragmentary top plan view, partly in section, of a part of the apparatus as seen in the direction of the arrow 6 in FIG. 4; and FIG. 7 is a section through a part of the apparatus substantially as taken on the line 7—7 of FIG. 5.

Referring to the drawings, and more particularly to FIGS. 2 to 7 thereof, the reference numeral 20 designates exemplary apparatus for producing inlaid floor covering F according to a certain method to-be-described. More particularly, the present apparatus is adapted to produce floor covering with inlays of such random disposition that the inlay pattern thereof is without repeat over any length of the floor covering. Also, the present apparatus is designed to produce continuous floor covering of a repeatless inlay pattern in a continuous operation. To this end, the method according to which the present apparatus performs contemplates moving a plurality of spaced blanking dies with blanking outlines of the shapes and sizes of inlays into random relative dispositions lengthwise and widthwise of, and in blanking opposition to a length of, the exposed composition of floor covering, moving the dies into and from blanking engagement with the covering composition, removing the blanked composition pieces from, and then inserting inlays into, the respective dies while out of engagement with the covering composition but still in the same random relative dispositions, again moving the dies into the same blanking engagement with the covering composition, then forcing the inlays from the dies into the covering composition while moving the dies from blanking engagement with the latter, and repeating the aforementioned steps with the dies in operative relation with progressive lengths of the compositions of the floor covering.

The floor covering F is, for the performance thereon of the present apparatus 20, backed against and fed on a longitudinal, and presently horizontal, track 22. The apparatus 20 comprises a plurality of blanking dies 24, presently only two for the sake of simplicity of illustration, which are movable on a carrier 26 into an infinite number of random relative dispositions. To this end, each die 24 is carried by a rotary device or turret 28 in the carrier 26 which itself is slidable relative to the track 22, transversely of the floor covering F, in guideways 30 in a supporting frame 32 (FIGS. 2 and 3) which is presently generally rectangular in outline and bridges the track 22. Thus, the two exemplary dies 24 are movable into an infinite number of random dispositions transversely of the floor covering F by virtue of the slidability of their common carrier 26, and they are also turnable into an infinite number of relative angular dispositions by virtue of the rotatability of their turrets 28 in the carrier 26. The dies 24 are, in the present instance laterally displaced from the rotary axes $x$—$x$ of the respective turrets 28 (FIGS. 5 and 2), wherefore the dies are, on random rotation of their turrets 28, also movable into relative dispositions of infinite variations in their spacing from each other both, longitudinally and transversely of the floor covering on the track.

Each of the turrets 28 further carries an inlay magazine 36, an inlay transfer device 38, a gear 40 for its rotation, and a cam follower 42 for its work stroke to-be-described. For subsequent individual identification of the exemplary two turrets 28, they are further designated by the reference numerals 28a and 28b, respectively. Since both turrets 28 and their aforementioned parts 24, 36, 38, 40 and 42 are, in the present instance, exactly alike, only one of these turrets, namely the turret 28a and its parts will be described in detail. Thus, and with particular reference to FIG. 5, the turret 28a which is cylindrical, is turnable in the carrier 26 about the axis $x$—$x$, and is also axially movable therein. The die 24 is presently carried at the lower end of a liner 44 in an opening 46 in the turret 28a. Mounted in the liner 44 is a cylinder 48 with a piston 50 having a rod 52 with an ejection plunger 54. The plunger 54 is normally urged into its retracted position (FIG. 5) by a spring 56, and is, on admission of fluid under pressure into the upper end of the cylinder 48 through a conduit 58, normally urged into the die 24 into a projected position in which it extends beyond the blanking edge 60 of the die. Communication between the conduit 58 and a supply of fluid under pressure may be provided and intercepted under the control of a suitable valve and through intermediation of a coupling and flexible hose (neither shown).

The magazine 36 is presently received in an opening 62 in the turret 28a and receives an orderly stack of superposed inlays $i$, with the magazine spaced from the bottom 64 of the opening 62 by a gap $g$ of sufficient width to permit the ejection of only the lowermost inlay from the magazine and its injection into the closely adjacent die 24 (FIG. 5). The inlays $i$ in the magazine 36 are by a spring-actuated plunger 66 urged to the lower or discharge end of the magazine.

The inlay transfer device 38 comprises a reciprocable transfer blade 68 having a work stroke from the retracted position shown in FIG. 5 into a projected position in which it will edgewise inject the lowermost inlay in the magazine 36 fully into the die 24, with the injected inlay permitted to gravitate toward the lower or blanking end of the die, preferably while the blade 68 is in its projected position. To this end, the blade 68 is carried by the armature 70 of a solenoid 72 which is mounted in a recess 74 in the turret 28a and, hence, movable therewith. A spring 76, presently acting on the armature 70, normally urges the transfer blade 68 into its retracted position, while the solenoid 72 on its energization urges the transfer blade into its described projected position.

The gear 40 is presently a ring gear secured to the turret 28a near its top and being in permanent mesh with a gear 78 on the drive shaft of a fixed prime mover 80 on the carrier 26. The ring gear 40 is of adequate width to remain in mesh with the gear 78 throughout an axial work stroke of the turret 28a.

The cam follower 42 is presently a ring received in a peripheral groove 82 in the turret 28a with freedom for relative rotation between the ring and turret. The follower ring 42 is provided with diametrically opposite peripheral grooves 84 which are inclined to its center axis (see also FIG. 4) for sliding reception of cam arms 86 to-be-described.

Following is a description of an operating cycle of the apparatus. Thus, assuming the floor covering F to be intermittently fed on the track 22 in the direction of the arrow 88 in FIG. 2 and being presently in an intermittent stop position, and with the die-carrying turrets 28 in their retracted positions (FIGS. 3 and 5), the turrets 28 are turned in the same or opposite directions into entirely random angular dispositions, and their common carrier 26 is moved transversely of the floor covering in either direction into any random disposition, in any desired sequence or simultaneously. In so doing, the dies 24 on the turrets 28 determine the random pattern-to-be of the inlays with which the floor covering are to be provided in the present operating cycle of the apparatus. Next, the turrets 28 are lowered for an operating stroke of their dies 24 into blanking engagement with the composition $c$ of the floor covering, with the blanked composition pieces $b$ (FIG. 5) remaining in the dies on their following return stroke with their turrets into fully or only partially retracted position. The plungers 54 are then projected into their respective dies 24 for positive ejection therefrom of the blanked composition pieces $b$ which are then blown away by air jets to-be-described so as not to block the recesses $r$ in the covering composition from which they were blanked out. On subsequent retraction of the plungers 54 from the respective dies 24 and while the latter are still retracted or already on their next work stroke into the same blanking engagement with the covering composition c, the solenoids 72 of the inlay transfer devices 38 are momentarily energized to project the respective blades 68 for the injection of the lowermost inlays i in the magazines into the associated dies 24 where they will gravitate toward the lower blanking ends of the latter into positions similar to that of the blanked composition piece b in the die of FIG. 5. The lower blanking ends of the dies 24 will, on the aforementioned next work stroke of the latter, reenter the same blanked-out recesses r in the covering composition c, whereupon the plungers 54 are again projected into their dies for injecting their inlays i into the respective composition recesses r. The plungers 54 are then not fully projected, being prevented from doing so by the inlays i just injected into the respective composition recesses r. However, as the dies 24 start on their return stroke, this time into fully retracted position in any event, the plungers 54 will initially lag behind until they reach their fully projected positions beyond the blanking ends of the dies and thus not only strip these inlays i clear of the retracting dies but also retain them in their composition recesses r. The plungers 54 are then fully retracted, and the present operating cycle of the apparatus is concluded with the return of the dies 24 into their fully retracted positions. The floor covering F may then be fed through the next intermittent step, whereupon the apparatus will perform another operating cycle like the one described. Thus operating cycles of the apparatus may alternate with intermittent feed steps of the floor covering for producing continuous inlaid floor covering in a continuous operation.

FIG. 1 shows a short length of entirely exemplary inlaid floor covering produced by the present apparatus. Thus, the inlays i in the composition c of this floor covering are shown as exemplary squares. It will be noted that these square inlays i are disposed quite at random, and their overall pattern is without a repeat over any length of the floor covering. With the exemplary two turrets 28 and their dies 24 spaced from each other transversely of the floor covering F, and presently also longitudinally thereof (FIG. 2), it is clear that the floor covering F is on each operating cycle of the apparatus provided with a pair p of inlays i (FIG. 1). Of course, while the inlay pattern thus progresses with the inlays from the turret 28b leading the inlays from the turret 28a longitudinally of the floor covering (FIGS. 1 and 2), the inlays in the floor covering are also aligned transversely of the floor covering as, for example, the inlays i' (FIG. 1), as will be readily understood. However, these transversely aligned inlays are variable spaced transversely of the floor covering by virtue of the movability of the carrier 26, and may, and will in most instances, be also variably spaced longitudinally of the floor covering by virtue of the rotatability of the die-carrying turrets. Also, the inlays may have an infinite number of relative angular dispositions also by virtue of the rotatability of the die-carrying turrets. Moreover, successive transversely aligned pairs of inlays may also be variably spaced from each other on merely varying the lengths of the intermittent feed steps of the floor covering, as will be readily understood. The inlay pattern may thus vary infinitely with hardly any likelihood of a repeat anywhere.

The inlay pattern of the floor covering may vary even further by providing for movability longitudinally of the floor covering of the supporting frame 32 which then serves as a transport for the transversely movable carrier 26. To this end, the transport 32 is movable in guideways 90 on a supporting structure 92 (FIG. 2).

For random turning of the turrets 28 for each operating cycle of the apparatus, each prime mover 80 may be an electric motor, with each or both being under suitable manual or automatic control. To add another element for stopping the turrets in random angular positions, the drive shafts of the motors 80 may carry drums 94 for cooperation with brake bands 96 which may be tightened on the respective drums by solenoids 98 that may be energized at different times. Of course, no more than jogs of the turrets of different extents, and in any event of much less than a revolution, are adequate for the purpose of random rotation of the turrets in each operating cycle of the apparatus. Mere jogging in this manner of the turrets is also of advantage since in the present exemplary apparatus the cylinders 48 in the turrets require for their communication with a common supply of fluid under pressure successive conduit sections connected by the aforementioned couplings (not shown) which permit relative rotation between these sections.

For moving the carrier 26 transversely of the floor covering F for each operating cycle of the apparatus, the same is presently connected by a rod 100 with a crankdisc 102 on a shaft 104 in the supporting frame or transport 32 (FIG. 2). The shaft 104 may, by suitable power and under any suitable control, be jogged in either direction to any extent for random disposition of the carrier 26 transversely of the floor covering.

The cam arms 86 associated with the turrets 28, respectively, are presently parts of prongs 106 of forks 108 which with their shanks 110 are guided for rectilinear movement in guides 112 on the carrier 26 (FIG. 2). As shown in FIG. 4, the cam arms 86 of each fork 108 are presently inclined to the guided rectilinear path of the latter, resulting in their cooperation with the opposite peripheral follower grooves 84 in the ring 42 on the respective turret 28 to move the latter axially, and hence the associated die 24 through a work stroke into and from operative engagement with the covering composition c, on movement of the fork 108 in opposite directions in its guided path. The free ends of the prongs 106 of these forks 108 are presently also connected by crosspieces 114. Both forks 108 are presently shifted for simultaneous strokes of the turrets and their dies toward the floor covering as well as away therefrom, by arms 116 and 118 of a rocker 120 which is pivoted at 122 to the carrier 26. To this end, and since both forks 108 with their cam arms 86 are preferably identical, these forks 108 are lengthwise disposed in opposition to each other (FIG. 2), with the arms 116 and 118 of the rocker 120 linked by floating pivot connections 124 with the shank 110 of the fork 108 for the turret 28b and with a shank 126 of the crosspiece 114 on the fork 108 for the other turret 28a, respectively. The forks 108 are presently further guided for rectilinear movement in guide blocks 127. Thus, with the rocker 120 in the position shown in FIG. 2, the positions of the fork 108 for the turret 28a in FIGS. 2 and 4 coincide, with the result that both turrets and their dies are in their fully retracted positions. Conversely, on turning the rocker 120 clockwise from the position in FIG. 2 into an opposite end position, both turrets will axially be moved for a stroke of their dies into blanking engagement with the covering composition. The rocker 120 is presently normally urged into the end position shown in FIG. 2 by a spring 128 which acts through one of the forks 108, and the rocker is moved into its other end position on energization of a solenoid 130 on the carrier 26, the armature 132 of which is connected with the rocker through a link 134. Any suitable control (not shown) may be provided for energizing the solenoid 130 during each operating cycle of the apparatus.

The aforementioned jets of air for blowing away the ejected composition pieces b are delivered from the nozzle ends of tubes 136 (FIGS. 3 and 5) which are mounted at 138 on the carrier 26. These tubes 136 may lead to a single conduit (not shown) which through a flexible hose connection may be in communication with the aforementioned supply of fluid under pressure, preferably compressed air, with suitably controlled valve means (not shown) being further provided to time the air jets during each operating cycle of the apparatus.

For the aforementioned movability of the transport 32, the same may be connected by rods 140 (FIG. 2) with simultaneously power-operated crank discs (not shown) which may be under any suitable control for moving the transport through equal distances or random distances, in either direction.

The movability of the transport 32 longitudinally of the floor covering F also permits inlay formation in the floor covering while the latter is fed continuously on the track 22. Thus, the transport 32 may be moved, in the direction of the arow 88 in FIG. 2, in synchronism with the continuously fed floor covering during an operating cycle of the apparatus, and may quickly be moved in the opposite direction between successive operating cycles of the apparatus, as will be readily understood.

While the inlays i in the exemplary floor covering F of FIG. 1 are not only of the same shape, but also of the same size, and of the same or different colors or surface textures, requiring corresponding identical outlines of the blanking edges of the dies 24 and corresponding identical cross-sectional shapes of the magazines 36, the present invention is by no means limited to the provision of inlays of the same shapes and sizes in floor covering. Thus, the dies on the turrets and their associated magazines may be shaped to conform to inlays of different shapes, respectively. In this connection, the present apparatus may provide floor covering F with inlays of different shapes, such as the star-shaped and crescent-shaped inlays i'' in FIG. 1A, for example. Also, the dies on the turrets and their associated magazines may be shaped to conform to inlays of the same shapes but of different sizes, respectively. In this connection, the present apparatus may provide floor covering F with inlays of the same shapes but different sizes, such as the star-shaped inlays i''' in FIG. 1B, for example. Further, the present apparatus, on being provided with sufficient turrets, may provide floor covering F with inlays of different shapes as well as with inlays of the same shapes but of different sizes. In this connection, the present apparatus may provide floor covering F with such varied inlays, such as the star-shaped and crescent-shaped inlays i''' and i'''' of different sizes in FIG. 1B, for example.

It follows from the preceding that the dies 24 are movable in different directions, and in fact in infinite directions, transversely of the direction of their work strokes, as well as turnable into an infinite number of relative angular dispositions, by various combinations of the movements of the transport 32 and/or carrier 26 and of the floor covering itself, as well as rotation of the die-carrying turrets 28. As a result, the inlay pattern produced by the present apparatus in floor covering may vary infinitely and is truly without repeat, with the aforementioned ensuing manifold advantages.

While in the present exemplary apparatus the turrets 28 are moved axially for the work strokes of the dies, it is of course fully within the purview of the present invention to bring the dies and floor covering into and from blanking engagement with each other on movement of the track 22 relative to the dies or on unitary movement of the turrets 28, carrier 26 and transport 32 relative to the track.

The composition c and the base b' of the floor covering F (FIG. 5) are, in the present instance, already brought together in their normal superposed relation, but are as yet unbonded, as they approach the apparatus 20 on the track 22. After passing the apparatus, the floor covering with the inlays may pass through a calender for bonding the composition c and inlays i to the base b'.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In apparatus for producing floor covering of a base and thereto bonded composition with a repeatless inlay pattern, the combination of a longitudinal track for supporting and guiding unbonded floor covering at its base so that its composition is exposed; a hollow die with a blanking edge of the outline of an inlay, said die being movable through a work stroke into and from blanking relation with the exposed composition to cut and carry a composition blank therefrom, said die being also movable transversely of said track into an infinite number of positions in which the exposed composition is within stroke reach of said die; means carried by said die for ejecting a composition blank from said die; means also carried by said die for injecting an inlay into said die; and means carried by and including said die and operative on a work stroke of said die for transferring an injected inlay from said die into the recess formed in the composition by said die on its previous work stroke.

2. The combination in apparatus as set forth in claim 1, in which the inlay outline of the blanking edge of said die is other than circular, and said die is also turnable about an axis extending in the direction of its work stroke.

3. The combination in apparatus as set forth in claim 1, in which said die is also movable longitudinally of said track into an infinite number of positions in which the exposed composition is within stroke reach of said die.

4. The combination in apparatus as set forth in claim 1, in which said blank ejecting means is a reciprocable plunger in said die, and said plunger also cooperates with said die in transferring an injected inlay from said die into said recess in the composition.

5. In apparatus for producing floor covering of a base and thereto bonded composition with a repeatless inlay pattern, the combination of a longitudinal track for supporting and guiding unbonded floor covering at its base so that its composition is exposed; a plurality of hollow dies with blanking edges of the outlines of inlays, respectively, said dies being movable through work strokes into and from blanking relation with the exposed composition to cut and carry composition blanks therefrom, and said dies being also independently movable transversely of said track into an infinite number of relative positions in which the exposed composition is within stroke reach of said dies; means carried by each die and operative to eject a composition blank from the die; and means also carried by each die for injecting into the latter an inlay of conforming outline, and said blank ejecting means being also operative on work strokes of the respective dies to transfer injected inlays from said dies into the recesses formed in the composition by the same dies on their previous work strokes.

6. The combination in apparatus as set forth in claim 5, in which said dies are further independently movable longitudinally of said track into an infinite number of relative positions in which the exposed composition is within stroke reach of said dies.

7. The combination in apparatus as set forth in claim 5, in which the inlay outlines of the blanking edges of said dies are other than circular, and each die is also independently turnable about an axis extending in the direction of its work stroke.

8. The combination in apparatus as set forth in claim 5, in which the blanking edges of said dies have the outlines of differently shaped inlays, respectively.

9. The combination in apparatus as set forth in claim 5, in which the blanking edges of said dies have the outlines of inlays of the same shapes but of different sizes, respectively.

10. The combination in apparatus as set forth in claim 5, in which the blanking edges of a number of said dies have the outlines of differently shaped inlays, respectively, and the blanking edges of the remaining number of said dies have the outlines of inlays of the same shapes but of different sizes, respectively.

11. In apparatus for producing floor covering of a base and thereto bonded composition with a repeatless inlay pattern, the combination of a longitudinal track for supporting and guiding unbonded floor covering at its base so that its composition is exposed; a support opposite the track; a carrier mounted in said support for rotation about an axis perpendicular to said track and also for movement in the direction of said axis; a hollow die with a blanking edge of the outline of an inlay, said die being mounted on said carrier in lateral displacement from the rotary axis of said carrier and being axially movable with said carrier through a work stroke into and from blanking relation with the exposed composition to cut and carry a composition blank therefrom, and said carrier being turnable into an infinite number of positions in which the exposed composition is within stroke reach of said die; means on said carrier for ejecting a composition blank from said die; means on said carrier for injecting an inlay into said die; and means on said carrier and including said die and operative on a work stroke of said carrier to transfer an injected inlay from said die into the recess formed in the composition by said die on its previous work stroke.

12. The combination in apparatus as set forth in claim 11, further comprising a magazine mounted on said carrier and holding an orderly supply of inlays, with said injecting means being operative to transfer an inlay from said magazine into said die.

13. In apparatus for producing floor covering of a base and thereto bonded composition with a repeatless inlay pattern, the combination of a longitudinal track for supporting and guiding unbonded floor covering at its base so that its composition is exposed; a support opposite the track; a plurality of carriers spaced apart transversely of the track and mounted in said support for rotation about axes perpendicular to the track and also for movement in the direction of their respective axes; hollow dies with blanking edges of the outlines of inlays, respectively, said dies being mounted on said carriers, respectively, in lateral displacement from the rotary axes of the respective carriers and being axially movable with their respective carriers through work strokes into and from blanking relation with the exposed composition to cut and carry composition blanks therefrom, and said carriers being independently turnable into an infinite number of relative positions in which the exposed composition is within stroke reach of said dies; means on each carrier operative to eject a composition blank from the respective die; and means on each carrier for injecting into the respective die an inlay of conforming outline, said blank ejecting means being further operative on work strokes of the respective dies to transfer injected inlays from the dies into the recess formed in the covering composition by the same dies on their previous work strokes.

14. The combination in apparatus as set forth in claim 13, further comprising conduits on said support for directing jets of compressed air between the exposed composition and dies, respectively, to blow away ejected composition blanks thereat.

15. The combination in apparatus as set forth in claim 13, in which said support is movable transversely of said track into an infinite number of positions in which the exposed composition is within stroke reach of said dies.

16. The combination in apparatus as set forth in claim 13, further comprising a transport movable back and forth longitudinally of said track and carrying said support for movement transversely of said track.

17. In apparatus for producing floor covering of a base and thereto bonded composition with a repeatless inlay pattern, the combination of a longitudinal track for supporting and guiding unbonded floor covering at its base so that its composition is exposed; a support opposite the track; and an operating unit on said support having a hollow die with an axis and a blanking edge of the outline of an inlay and being turnable about said axis and also axially movable through a work stroke into and from blanking relation with the exposed composition to cut and carry a composition blank therefrom, a magazine holding an orderly supply of inlays and being turnable with said die, an axially reciprocable plunger slidably fitting in said die for ejecting a composition blank from said die, and a device turnable with said die and including said plunger and being operative to transfer an inlay from said magazine into the recess formed in the composition by said die on its previous work stroke.

18. In apparatus for producing inlaid floor covering of a base and thereto bonded composition, the combination of a longitudinal track for supporting and guiding unbonded floor covering at its base so that its composition is exposed; a support member opposite the track; a hollow die member having a blanking edge of the outline of an inlay and being carried by said support member for successive reciprocations to and from exposed composition on said track alternately to cut and carry a composition blank therefrom and to carry an inlay to a die-formed recess therein; a magazine on one of said members holding an orderly supply of inlays; means operable to transfer an inlay from said magazine into said die; and a plunger reciprocable in said die for alternately ejecting a composition blank and an inlay therefrom.

19. The combination in apparatus as set forth in claim 18, further comprising a conduit on one of said members for directing compressed air between said die member and exposed composition on said track to blow ejected composition blanks out of alignment with said die member.

References Cited in the file of this patent

UNITED STATES PATENTS 1,824,041    Emig  ------------------ Sept. 22, 1931

FOREIGN PATENTS 695,126    Great Britain ------------ Aug. 5, 1953